United States Patent
Black et al.

(10) Patent No.: US 12,302,878 B1
(45) Date of Patent: May 20, 2025

(54) DEVICES AND METHODS FOR RETAINING FISH BAIT

(71) Applicants: Wayne J. Black, Vancouver, WA (US); Tenny M. Mount, Gresham, OR (US)

(72) Inventors: Wayne J. Black, Vancouver, WA (US); Tenny M. Mount, Gresham, OR (US)

(*) Notice: Subject to any disclaimer, the term of this patent is extended or adjusted under 35 U.S.C. 154(b) by 0 days.

(21) Appl. No.: 18/809,010

(22) Filed: Aug. 19, 2024

(51) Int. Cl.
*A01K 83/06* (2006.01)
*A01K 85/01* (2006.01)

(52) U.S. Cl.
CPC ............ *A01K 83/064* (2022.02); *A01K 83/06* (2013.01); *A01K 85/018* (2022.02); *A01K 85/019* (2022.02)

(58) Field of Classification Search
CPC .... A01K 85/01; A01K 85/018; A01K 85/019; A01K 97/02; A01K 83/06; A01K 84/061; A01K 83/063; A01K 83/064
USPC ........ 43/42.06, 44.99, 44.2, 44.4, 44.6, 44.8
See application file for complete search history.

(56) References Cited

U.S. PATENT DOCUMENTS

| | | | | |
|---|---|---|---|---|
| 489,110 A * | 1/1893 | Welch | ............. | A01K 83/06 43/41 |
| 717,681 A * | 1/1903 | Hodge | ............. | A01K 93/00 43/44.99 |
| 1,854,696 A * | 4/1932 | Herington | ............. | A01K 85/16 43/42.48 |
| 2,004,308 A * | 6/1935 | Catarau | ............. | A01K 85/16 43/42.06 |
| 2,008,004 A * | 7/1935 | Catarau | ............. | A01K 85/16 43/41 |
| 2,010,976 A * | 8/1935 | Catarau | ............. | A01K 85/16 43/42.48 |
| 2,129,245 A * | 9/1938 | Stenstrom | ............. | A01K 85/16 43/42.26 |
| 2,338,577 A * | 1/1944 | Divine | ............. | A01K 85/16 43/42.34 |
| 2,556,634 A * | 6/1951 | Redinger | ............. | A01K 85/16 43/41 |
| 2,600,314 A * | 6/1952 | Miner | ............. | A01K 83/06 43/44.2 |
| 2,614,358 A * | 10/1952 | Adams | ............. | A01K 97/02 43/44.99 |
| 2,718,086 A * | 9/1955 | Miner | ............. | A01K 85/16 43/43.14 |
| 2,774,174 A * | 12/1956 | Ganger | ............. | A01K 95/00 43/44.99 |

(Continued)

FOREIGN PATENT DOCUMENTS

CN    101986838 A  *  3/2011
CN    215836629 U  *  2/2022

(Continued)

*Primary Examiner* — Darren W Ark
(74) *Attorney, Agent, or Firm* — Sheridan Ross P.C.

(57) ABSTRACT

The present disclosure relates to systems, devices, and methods for retaining fish bait. A fish bait retainer provided as part of the disclosed systems, devices, and methods includes a plurality of fish bait retaining features. The fish bait retaining features can be in the form of structural features, such as through holes, blind holes, and grooves. The fish bait retainer can also include surface properties or features that facilitate the retention of fish bait. The fish bait retainer can be securely connected to a fishhook by placing a shank of the fishhook a through hole provided in the fish bait retainer. The fish bait retainer can be used with liquid, gel, or paste type fish bait.

20 Claims, 9 Drawing Sheets

(56) References Cited

U.S. PATENT DOCUMENTS

| | | | |
|---|---|---|---|
| 2,780,021 A | 2/1957 | Fagg | |
| 2,791,058 A * | 5/1957 | Bettini | A01K 85/01 239/57 |
| 2,797,517 A * | 7/1957 | Eriksen | A01K 85/01 43/42.05 |
| 2,869,279 A * | 1/1959 | Pretorius | A01K 97/045 43/42.24 |
| 2,922,246 A * | 1/1960 | Mileschuk | A01K 85/01 43/42.47 |
| 2,968,113 A * | 1/1961 | Multanen | A01K 85/02 43/37 |
| 3,047,975 A * | 8/1962 | Pretorius | A01K 97/045 43/44.2 |
| 3,108,389 A * | 10/1963 | McGuire | A01K 85/00 43/42.06 |
| 3,434,230 A * | 3/1969 | Littlefield | A01K 85/16 43/42.06 |
| 3,492,752 A | 2/1970 | Viveiros | |
| 3,688,430 A * | 9/1972 | Balch | A01K 85/01 43/41 |
| 3,780,467 A * | 12/1973 | Lueck | A01K 93/00 43/44.87 |
| 3,973,350 A * | 8/1976 | England | A01K 91/20 43/42.39 |
| 3,991,504 A * | 11/1976 | Pieper | A01K 85/00 43/42.06 |
| 4,098,017 A * | 7/1978 | Hall | A01K 85/01 43/42.31 |
| 4,197,667 A * | 4/1980 | Helfenstine | A01K 85/00 43/4.5 |
| 4,520,588 A * | 6/1985 | Hindermyer | A01K 85/01 43/42.36 |
| 4,603,502 A * | 8/1986 | MacDonald | A01K 83/06 43/44.99 |
| 4,827,657 A | 5/1989 | Slehofer | |
| 4,879,831 A * | 11/1989 | Herrlich | A01K 85/01 43/17.6 |
| 4,964,235 A * | 10/1990 | Gruelle | A01K 85/01 43/42.06 |
| 5,155,947 A * | 10/1992 | Rivard | A01K 85/01 43/42.06 |
| 5,471,780 A * | 12/1995 | Hopson | A01K 85/01 43/42.06 |
| 5,517,781 A * | 5/1996 | Paoletta, Jr. | A01K 85/01 43/42.24 |
| 5,555,670 A * | 9/1996 | Troutman, Jr. | A01K 97/02 43/44.99 |
| 5,603,182 A * | 2/1997 | Wilson | A01K 85/01 43/44.99 |
| 5,678,349 A * | 10/1997 | Pacora | A01K 85/16 43/42.35 |
| 6,115,956 A * | 9/2000 | Firmin | A01K 85/00 43/42.24 |
| 6,158,161 A * | 12/2000 | Rossman | A01K 85/16 43/42.35 |
| 7,000,346 B1 * | 2/2006 | Jussaume | A01K 85/16 43/42.32 |
| 7,131,233 B1 * | 11/2006 | Preston | A01K 85/01 43/42.06 |
| 7,490,432 B2 | 2/2009 | Gillihan | |
| 7,621,072 B2 * | 11/2009 | Brasseur | A01K 91/08 43/44.96 |
| D704,796 S | 5/2014 | LaFlamme | |
| D705,386 S | 5/2014 | Gray | |
| 9,125,390 B1 * | 9/2015 | Kreamalmyer | A01K 85/01 |
| 9,713,323 B2 * | 7/2017 | Jenkins | A01K 97/02 |
| 9,770,015 B2 * | 9/2017 | Slocum | A01K 97/05 |
| 10,932,458 B2 * | 3/2021 | Manty | A01K 85/00 |
| 11,412,722 B1 * | 8/2022 | Standke | A01K 83/06 |
| 2004/0068916 A1 * | 4/2004 | Harris | A01K 97/02 43/44.99 |
| 2006/0005455 A1 * | 1/2006 | Berge | A01K 85/01 43/42.06 |
| 2007/0163165 A1 * | 7/2007 | Castro | A01K 85/00 43/42.34 |
| 2010/0281755 A1 * | 11/2010 | Armour | A01K 97/04 43/41 |
| 2014/0208632 A1 * | 7/2014 | Rhoda | A01K 83/06 43/44.8 |
| 2014/0373426 A1 * | 12/2014 | Beaubien | A01K 85/01 43/17.6 |
| 2016/0057982 A1 * | 3/2016 | Slocum | A01K 85/18 43/42.06 |
| 2018/0132461 A1 * | 5/2018 | Caldeira | A01K 85/128 |
| 2018/0295823 A1 * | 10/2018 | Yang | A01K 85/01 |
| 2018/0368381 A1 * | 12/2018 | Rosier | A01K 97/02 |
| 2020/0068865 A1 * | 3/2020 | Kahl | A01K 95/00 |
| 2020/0352148 A1 * | 11/2020 | Mancini | A01K 85/01 |
| 2020/0390075 A1 * | 12/2020 | Neubauer | A01K 85/01 |
| 2021/0307306 A1 * | 10/2021 | Di Giulio | A01K 85/01 |
| 2021/0337778 A1 * | 11/2021 | Boyette | A01K 97/02 |
| 2021/0352880 A1 * | 11/2021 | Zertuche | A01K 83/06 |
| 2022/0095600 A1 | 3/2022 | Gillihan | |
| 2022/0174923 A1 * | 6/2022 | DiModica | A01K 85/1847 |
| 2023/0210098 A1 * | 7/2023 | Phillips | A01K 85/018 43/42.06 |
| 2024/0032521 A1 * | 2/2024 | Ellwood | A01K 97/02 |
| 2024/0324564 A1 * | 10/2024 | Levy | A01K 85/1847 |
| 2024/0334918 A1 * | 10/2024 | Akopov | A01K 85/01 |
| 2024/0365763 A1 * | 11/2024 | Goehler | A01K 85/018 |

FOREIGN PATENT DOCUMENTS

| | | | | |
|---|---|---|---|---|
| DE | 9216304 U1 * | 3/1993 | | |
| DE | 29717766 U1 * | 11/1997 | | A01K 97/02 |
| EP | 3066921 A1 * | 9/2016 | | A01K 91/06 |
| FR | 719839 A * | 2/1932 | | |
| FR | 839461 A * | 4/1939 | | |
| FR | 1366951 A * | 7/1964 | | |
| GB | 2407954 A * | 5/2005 | | A01K 85/01 |
| GB | 2446466 A * | 8/2008 | | A01K 97/02 |
| GB | 2509756 A * | 7/2014 | | A01K 97/00 |
| GB | 2531262 A * | 4/2016 | | A01K 97/02 |
| HR | P20020582 A2 * | 6/2004 | | |
| JP | 2014100134 A * | 6/2014 | | |
| JP | 2014117256 A * | 6/2014 | | |
| JP | 2017158540 A * | 9/2017 | | |
| KR | 20020005845 A * | 1/2002 | | |
| WO | WO-9418826 A1 * | 9/1994 | | A01K 97/02 |
| WO | WO 2012/060870 | 5/2012 | | |
| WO | WO-2017070118 A1 * | 4/2017 | | A01K 83/06 |

* cited by examiner

DEVICES AND METHODS FOR RETAINING FISH BAIT

FIELD

Devices and methods for retaining fish bait are provided. The disclosed fish bait retaining devices and methods can be used to position fish bait of various types on a fishhook.

BACKGROUND

In line and hook fishing, an attractant in the form of an artificial lure or live bait is typically joined to a hook, and the hook is tied to a line that is held by a fisherman, either directly or using a fishing apparatus, such as a rod and reel. The hook and the attached attractant are then placed in water believed to contain the desired fish. In order to improve the chances of catching a fish, scented fish baits have been developed. Such fish baits can be in the form of oils or other liquids, pastes, gels, and the like. However, securely retaining fish bait on or near the hook has proven difficult.

In order to secure fish bait on or near a fishhook, various devices have been developed. For example, fish bait containment devices including capsules, cages, bladders, mesh enclosures and other structures meant to enclose fish bait, have been developed. However, such devices are typically cumbersome and are time-consuming to load with fish bait. In addition, the fish bait is largely hidden within the device, rather than exposed to the surrounding water. Fish bait containment devices can also be ineffective if used with liquid attractants. Fish bait retainers can also include wire-based devices, such as springs, coils and the like. Such wire-based designs are well suited for use with dough type fish bait. However, liquid or gel type attractants cannot be used with wire based fish bait retainers. In addition, such devices are typically difficult to detach when replacement is required or desired. Fish bait retainers in the form of sponges can be effective when used with liquid or gel attractants. However, sponges do not work well with dough or paste type fish baits. In addition, sponge type fish bait retainers are typically not durable and long-lasting. Still other fish bait retainers in the form of plastic or lead structures molded onto or otherwise attached to the shank of a hook are available. Although such fish bait retainers can be somewhat effective at retaining dough fish baits, they are not effective at retaining liquid or gel attractants. For use with dough or paste type fish baits, fish bait retainers in the form of holding tubes or so-called dippers are available. In a typical configuration, a dipper includes an open fish bait holding structure formed from a plastic mesh or perforated tubes. Though effective at receiving dough or paste type fish bait, such devices are not particularly effective at retaining the fish bait over multiple casts. For use with liquid fish bait, reservoirs or bladders intended to release fish bait over time are available. However, such devices are not particularly effective at maintaining fish bait such that it is both held within the vicinity of the hook and exposed to the surrounding water.

Accordingly, it would be desirable to provide a fish bait retainer for use with fish attractant or bait in a wide variety of formats and that is long-lasting and durable.

SUMMARY

Embodiments of the present disclosure provide systems and methods that are directed to solving these and other problems and disadvantages of the prior art. More particularly, embodiments of the present disclosure provide a fish bait retainer that facilitates the placement and retention of fish bait on a fishhook. A fish bait retainer as disclosed herein can be used to retain a wide variety of fish bait types. For instance, a fish bait retainer as disclosed herein can be used to retain liquid, gel, dough, and paste type fish baits.

A fish bait retainer in accordance with at least some embodiments of the present disclosure can have a generally spherical or elongate spherical form. In addition, a plurality of fish bait retaining features, such as channels or other structures, are formed in the fish bait retainer. The fish bait retaining features can include through holes, blind holes, and grooves. In addition, the fish bait retainer can include a through channel for receiving the shank of a fishhook. In at least some embodiments, the through channel for receiving the shank of the fishhook is disposed along a central or longitudinal axis of the fish bait retainer. Fish bait retaining features can be disposed radially about the central axis. For instance, various fish bait retaining features can be disposed symmetrically about the central axis. In accordance with further embodiments, the fish bait retaining features can extend along lines that are parallel to the central axis. The fish bait retaining features can provide pockets and depressions that are effective at retaining fish bait placed over the fish bait retainer. The fish bait retainer can also include a surface or surface portions having a texture, material characteristics, or texture and material characteristics adapted to retain fish bait.

In accordance with further embodiments of the present disclosure, methods of retaining fish bait proximate to the point of a fishhook are provided. The methods include providing a fish bait retainer that includes a plurality of fish bait retaining features, and placing the fish bait retainer over the shank of the fishhook. A selected fish bait is then placed within the fish bait retaining features, and over an exterior surface of the fish bait retainer. After or prior to placing the fish bait on the fish bait retainer, the eye of the fishhook can be tied to a fishing line. The hook, with the attached fish bait retainer, and with the fish bait loaded into and on the fish bait retainer, can then be placed in water believed to contain a desired fish.

Additional features and advantages of embodiments of the present disclosure will become more readily apparent from the following description, particularly when taken together with the accompanying drawings.

DETAILED DESCRIPTION

Figure 1:
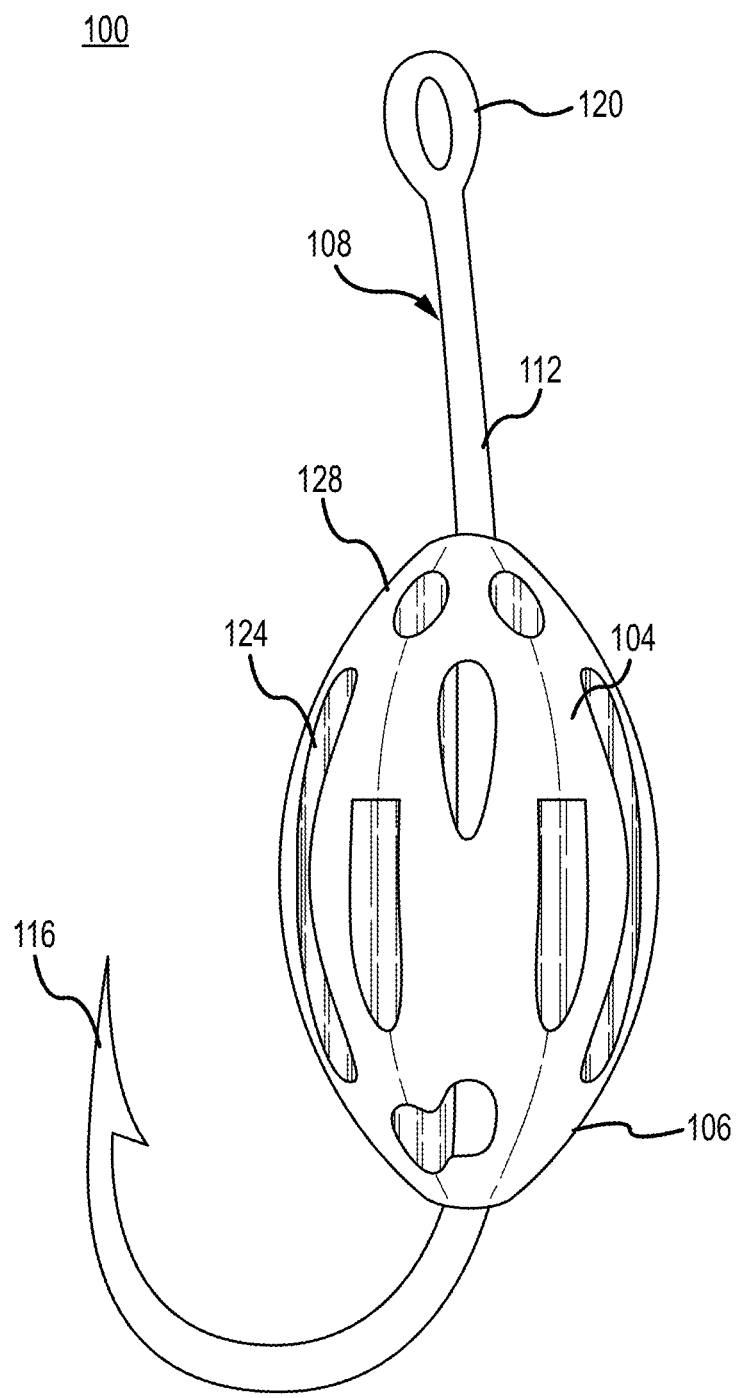
FIG. 1 depicts a fish bait retainer in accordance with embodiments of the present disclosure joined to a fishhook.

FIG. 1 depicts a fishing tackle assembly 100 that includes a fishing device or fish bait retainer 104 in accordance with embodiments of the present disclosure joined to a fishhook 108. As shown, the fish bait retainer 104 is configured to fit over the shank 112 of the fishhook 108, leaving the point 116 of the hook and the eye 120 of the hook uncovered. In accordance with embodiments of the present disclosure, a fish bait retainer 104 as disclosed herein can be used in combination with a bare fishhook 108, or with a fishhook 108 that is provided as part of an artificial lure. In at least some embodiments, the fish bait retainer 104 has a body member 106 with a generally elliptical or prolate spheroid exterior shape. In addition, and as described in greater detail elsewhere herein, the fish bait retainer 104 includes a number of fish bait retaining features or structures 124. The fish bait retainer 104 also includes at least one through hole, for instance in the form of a central through hole 128, that is configured to receive the shank 112 of the fishhook 108. As an example, but without limitation, the fish bait retainer 104 can be formed from a molded elastomer.

FIGS. 2A, 2B, 2C, 2D, 2E and 2F depict a fish bait retainer 104 in accordance with embodiments of the present disclosure in a perspective view, a side elevation view, a first end elevation view, a second end elevation view, a first cross-section view taken along a central axis and a first radius, and a second cross-section view taken along the central axis and a second radius respectively. As shown, the fish bait retainer 104 can include a central through hole 128 that extends from a first end 204 of the fish bait retainer 104 to a second end 208 of the fish bait retainer 104. In accordance with at least some embodiments of the present disclosure, the central through hole 128 is disposed along a line that corresponds to a central axis 212 of the fish bait retainer 104. Moreover, where, as in the embodiment depicted in FIGS. 2A-2F, the fish bait retainer 104 has a generally oblong or football shaped exterior form, the central axis 212 can coincide with a longitudinal axis of the fish bait retainer 104.

The fish bait retaining features 124 of the fish bait retainer 104 can include one or more through holes 216 (i.e. through holes that are in addition to the central through hole 128), one or more blind holes 220, and one or more grooves 224. In accordance with at least some embodiments of the present disclosure, a fish bait retainer 104 can include different fish bait retaining features 124 in different combinations. For example, a fish bait retainer 104 as disclosed herein can include one or more through holes 216, in combination with either one or more blind holes 220 or one or more grooves 224. As another example, a fish bait retainer 104 as disclosed herein can include one or more grooves 224 in combination with either one or more through holes 216 or one or more blind holes 220. As still another example, a fish bait retainer 104 can include fish bait retaining features 124 in the form of a plurality of through holes 216 only, a plurality of blind holes 220 only, or a plurality of grooves 224 only.

The fish bait retaining features 124 of a fish bait retainer 104 as disclosed herein can be disposed about an axis of the fish bait retainer 104. For example, as depicted in FIGS. 2A-2E, the fish bait retaining features 124 can be parallel to a central through hole 128 that is coincident with a central or longitudinal axis 212 of the fish bait retainer 104. As also depicted, the fish bait retaining features 124 can be equally spaced radially about the central through hole 128. In the particular example illustrated in FIGS. 2A-2E, there are three through holes 216a-c that are parallel to the central through hole 128 and that are equally radially spaced about and a first distance from the central axis 212 of the bait retainer. In addition, there are three blind holes 220a-c that are parallel to the central through hole 128 and that are equally radially spaced about and the first distance from the central through hole 128. Moreover, the through holes 216 and the blind holes 220 are radially interleaved with one another. In the depicted example, the blind holes 220 extend from an exterior surface 228 of the fish bait retainer 104 to a depth that coincides with or is near to a midline 236 of the fish bait retainer 104. In accordance with other embodiments of the present disclosure, blind holes 220 with lesser or greater depths can be provided.

Also in the example shown in FIGS. 2A-2F, twelve grooves 224 that are parallel to the central through hole 128 and that are equally radially spaced about the central through hole 128 are included as part of the fish bait retaining features 124. In the illustrated example, three of the grooves 224 are full length grooves 224a-c that extend from the first half 226 of the fish bait retainer 104, across the midline 236, and into the second half 232 of the fish bait retainer 104. The other nine grooves 224 are truncated grooves 224d-1. Six of the truncated grooves 224d-i extend from the first half 226 to at or about the midline 236 of the fish bait retainer 104, where they are each terminated at a wall 240. The remaining three of the truncated grooves 224j-l extend from the second half 232 of the fish bait retainer 104, to at or about the midline 236 of the fish bait retainer 104, where they are each terminated at a wall 240. As also shown, the full length grooves 224a-c and the truncated grooves 224d-f can be radially interleaved with one another. As shown in the figures, these three truncated grooves 224j-l can have a groove depth that decreases with increasing distance from the second end 208 of the fish bait retainer 104. Accordingly, some truncated grooves can be terminated at a point where a bottom of the groove becomes coincident with an outer surface of the fish bait retainer 104.

Figure 2A:
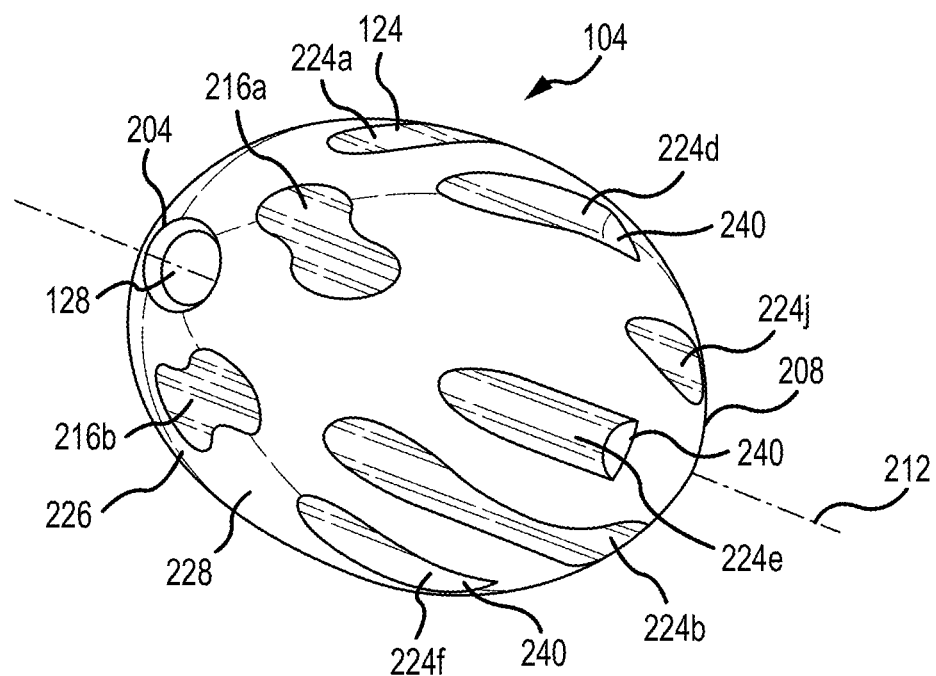
FIG. 2A depicts a fish bait retainer in accordance with embodiments of the present disclosure in a perspective view.
Figure 2B:
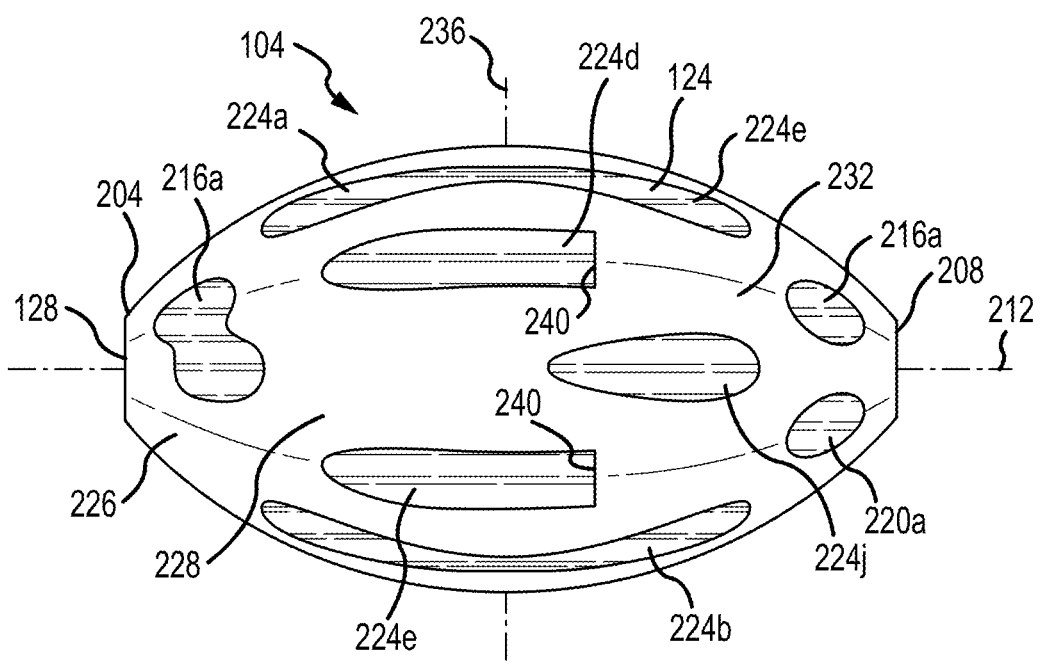
FIG. 2B depicts a fish bait retainer in accordance with embodiments of the present disclosure in a side elevation view.
Figure 2C:
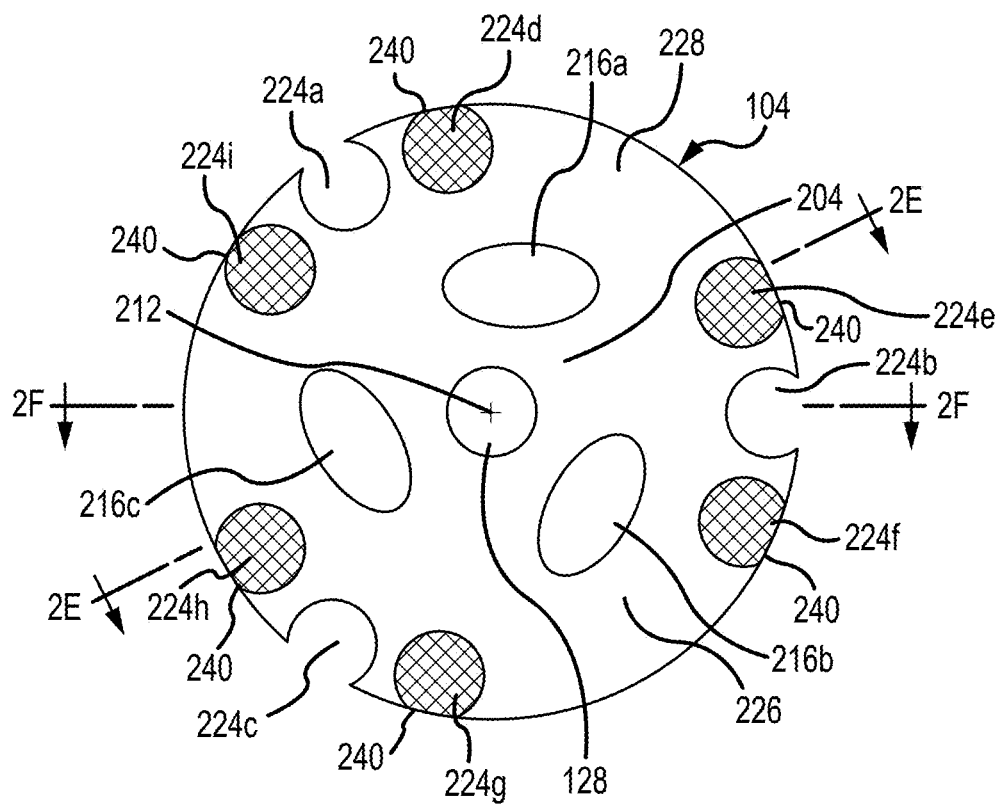
FIG. 2C depicts a fish bait retainer in accordance with embodiments of the present disclosure in a first end elevation view.
Figure 2D:
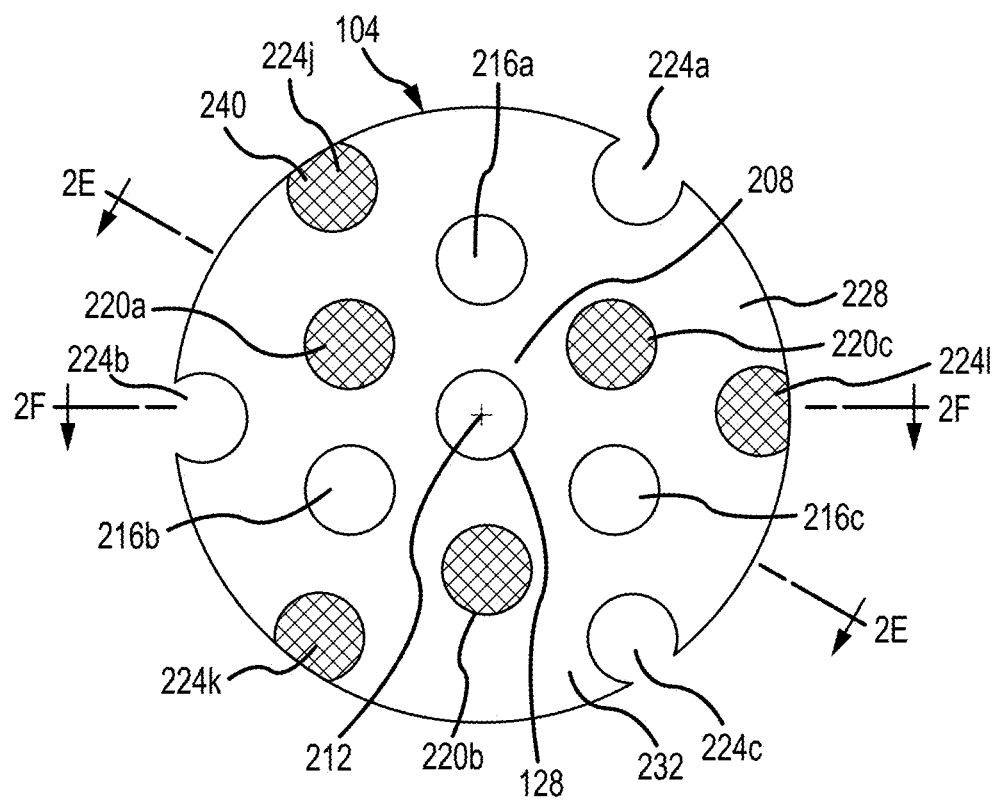
FIG. 2D depicts a fish bait retainer in accordance with embodiments of the present disclosure in a second end elevation view.
Figure 2E:
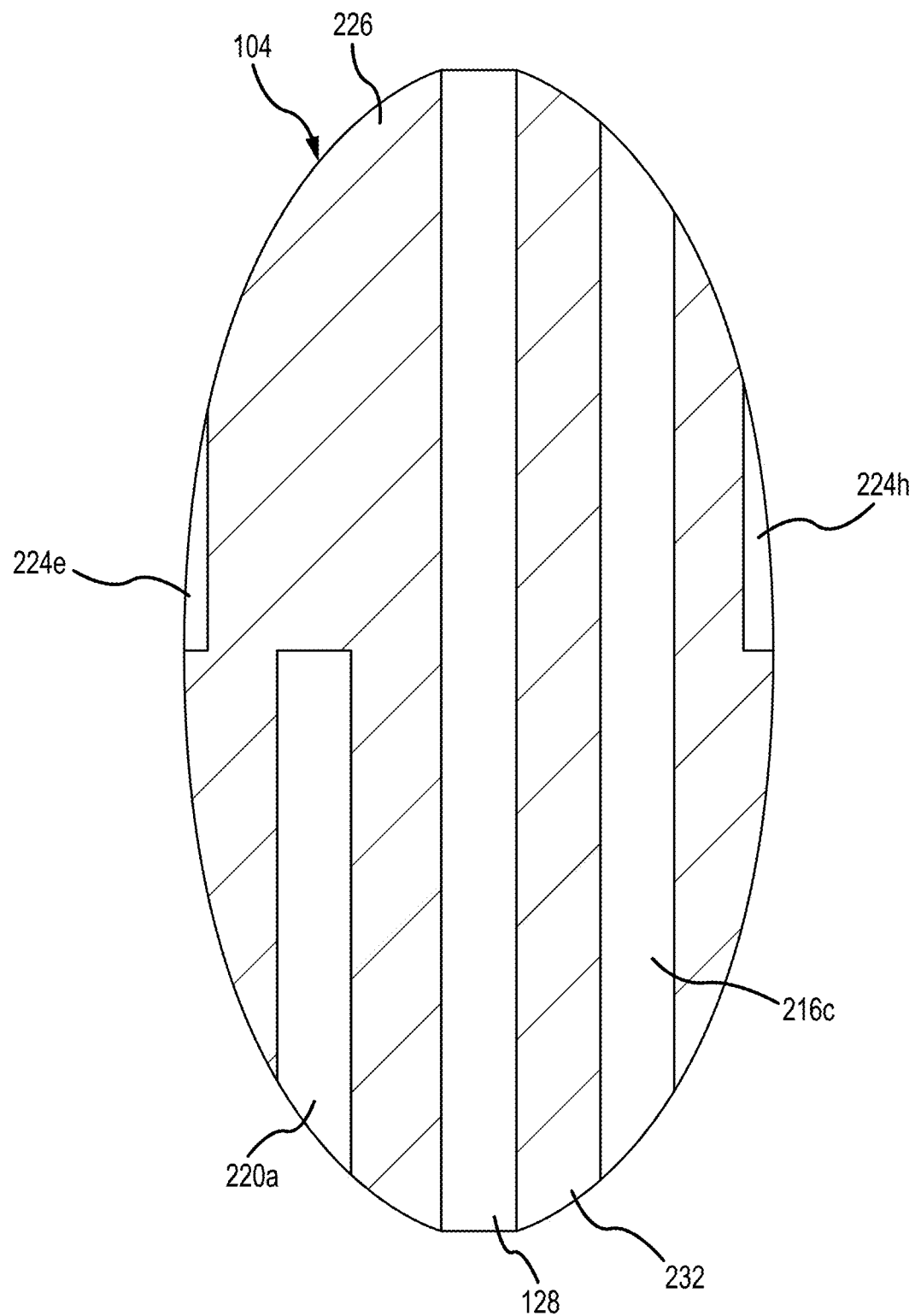
FIG. 2E depicts a fish bait retainer in accordance with embodiments of the present disclosure in a first cross-section taken along a central axis and a first radius (labeled 2E in FIGS. 2C and 2D) of the fish bait retainer.
Figure 2F:
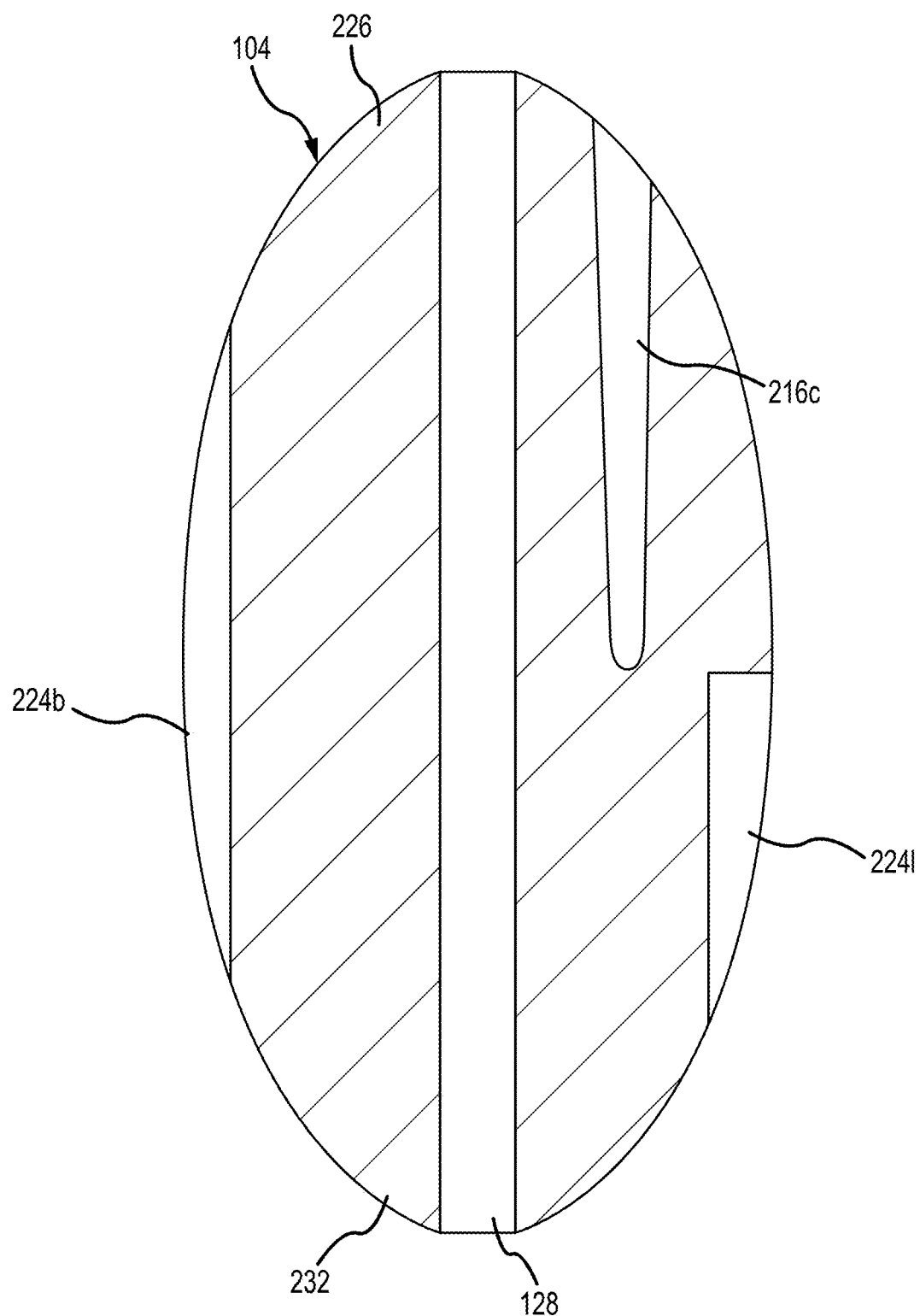
FIG. 2F depicts a fish bait retainer in accordance with embodiments of the present disclosure in a second cross-section taken along a central axis and a second radius (labeled 2F in FIGS. 2C and 2D) of the fish bait retainer.

In accordance with embodiments of the present disclosure, some or all of the fish bait retaining features 124 can have a cross-sectional size, curvature, or other features that are constant along their length. For instance, comparing the first end view of the fish bait retainer 104 as depicted in FIG. 2C to the second end view of the fish bait retainer 104 as depicted in FIG. 2D, grooves 224a, 224b, and 224c can be seen to have the same size and cross section at the first 226 and second 232 ends of the fish bait retainer 104. In accordance with other embodiments of the present disclosure, some or all of the fish bait retaining features 124 can have a cross-sectional size, curvature, or other features that vary along their length. For instance, again comparing the first end view of the fish bait retainer 104 depicted in FIG. 2C to the second end view of the fish bait retainer 104 depicted in FIG. 2D, and also as shown in FIGS. 2E and 2F, the through holes 216a, 216b, and 216c can be seen to have a first size and generally round cross section at the first 226 end of the fish bait retainer 104, and a second, larger size and a generally elongated cross section at the second 232 end of the fish bait retainer 104, where the first size is smaller than the second size.

As depicted in FIGS. 2A-2F, the fish bait retaining features 124 can be disposed about the central axis 212 of the fish bait retainer 104. In addition, the fish bait retaining features 124 can be disposed along individual axes that parallel to one another. In accordance with further embodiments of the present disclosure, the fish bait retaining features 124 need not be parallel to the central axis 212 or to one another. Moreover, some or all of the fish bait retaining features 124 can extend along paths that are curved, segmented, or that otherwise deviate from an individual axis.

Figure 3A:
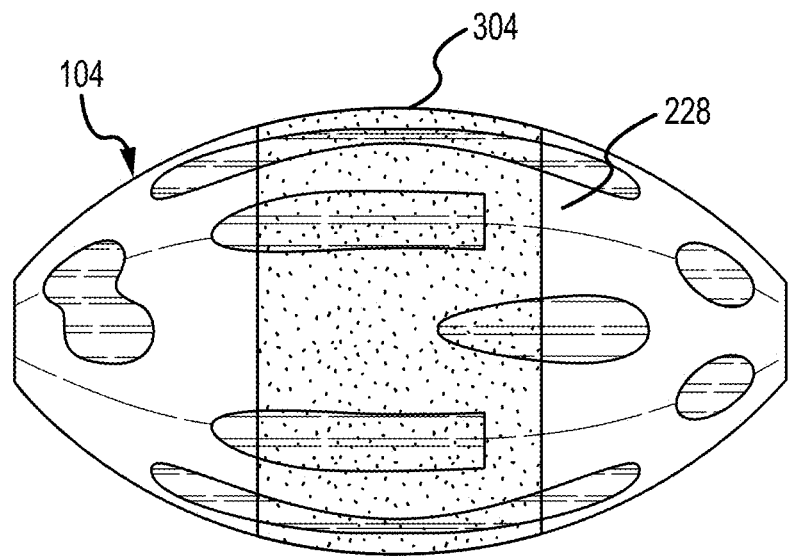
FIG. 3A depicts a fish bait retainer with a selected surface texture in accordance with embodiments of the present disclosure in a side elevation view.

In accordance with at least some embodiments of the present disclosure, a fish bait retainer 104 as disclosed herein can include a wetted or exposed surface 228 that is configured to retain fish bait. For example, in accordance with at least some embodiments, all or portions of the surface 228 of the fish bait retainer 104 can have a surface roughness or a texture configured to facilitate the retention of a fish bait. For example, as depicted in FIG. 3A, the surface 228 of the fish bait retainer, including surfaces of some or all of the through holes 216, blind holes 220, and grooves 224 within that central portion can include a selected surface texture 304. As another example, the surface 228 of the fish bait retainer 104 in all areas other than within through holes 216, blind holes 220, and grooves 224 can be textured. As examples, but without limitation, a selected surface texture 304 of the surface 228 of the fish bait retainer 104 can be in the form of dimples, projections, or as a selected surface roughness. In general, where a selected surface texture 304 is present in the form of structural features or roughness, the average peak to valley size of the surface texture 304 features is an order of magnitude less than a maximum diameter of any of the fish bait retaining features 124. The selected surface texture 304 can be selected to retain at least one of oil, gel, paste, and dough type fish baits.

Figure 3B:
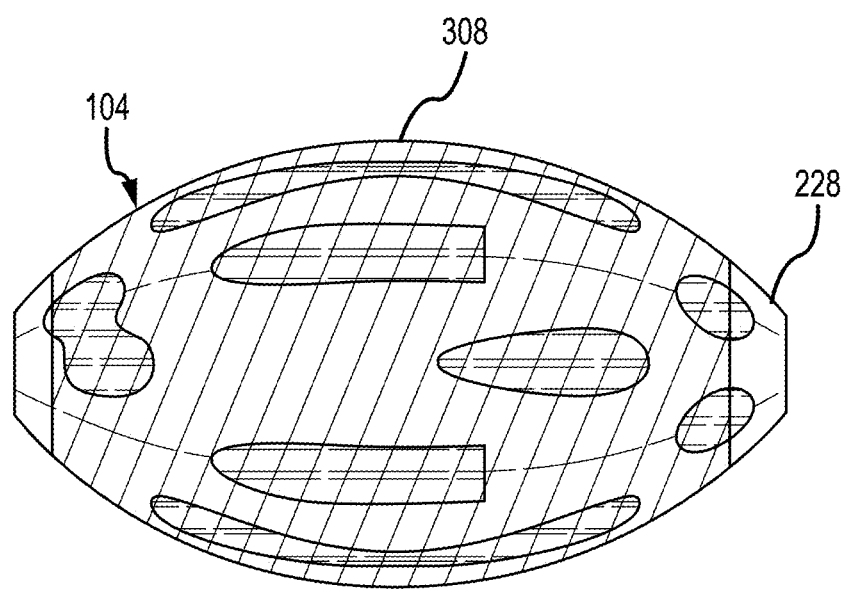
FIG. 3B depicts a fish bait retainer with a selected surface coating in accordance with other embodiments of the present disclosure in a side elevation view.

In accordance with further embodiments of the present disclosure, a fish bait retainer 104 as disclosed herein can include a coating 308 disposed across some or all of the exterior surface 228 of the fish bait retainer 104, as shown in FIG. 3B. The material of the coating 308 can have properties that encourage the retention of fish bait. Alternatively or in addition, the coating 308 can be provided to protect the underlying material of the fish bait retainer 104, improving the longevity of the fish bait retainer 104.

Figure 4:
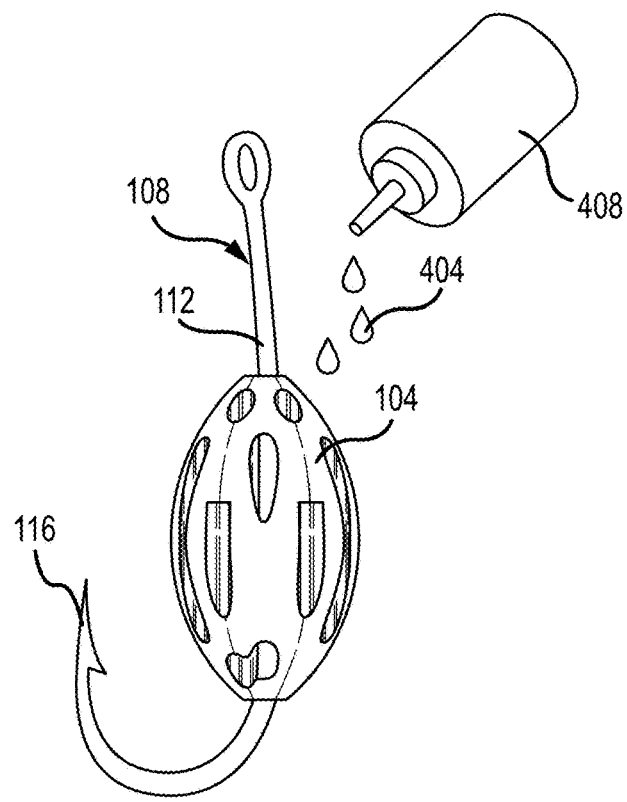
FIG. 4 depicts a fish bait retainer in accordance with embodiments of the present disclosure with a liquid type fish bait being applied.

FIG. 4 depicts a fish bait retainer 104 in accordance with embodiments of the present disclosure with a liquid or gel type fish bait 404 being applied. In this example, the liquid fish bait 404 is being dispensed from a bottle 408. More particularly, the liquid fish bait 404 is being applied from the top of the bait retainer 104, allowing the bait retention features 124 to be filled with the fish bait 404. In addition to the bait retention features 124, the material properties of the exterior surface 228 of the fish bait retainer 104, the surface texture 304 of the exterior surface 228, and the material properties of any coating 308 on the exterior surface 228, each alone or in various combinations, can act to facilitate the retention of the liquid fish bait 404. Moreover, with the fish bait retainer 104 positioned on the shank 112 of a fishhook 108, the fish bait 504 is held in proximity to the point 116.

Figure 5:
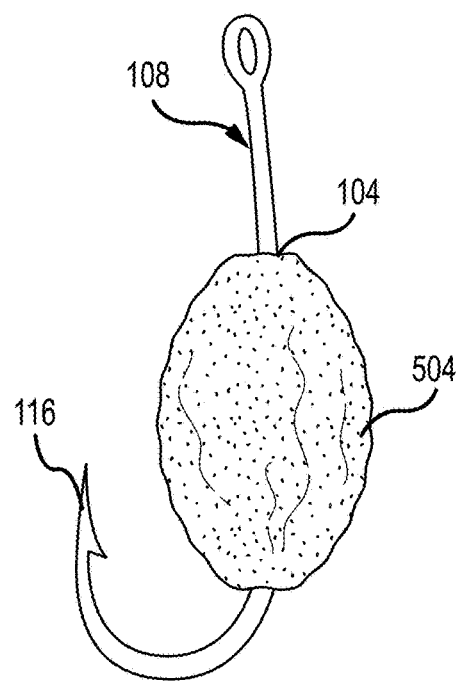
FIG. 5 depicts a fish bait retainer in accordance with embodiments of the present disclosure with a dough or paste type fish bait applied.

FIG. 5 depicts a fish bait retainer 104 in accordance with embodiments of the present disclosure with a dough or paste type fish bait 504 applied over substantially all of the fish bait retainer 104. As can be appreciated by one of skill in the art after consideration of the present disclosure, the fish bait retaining features 124 of the fish bait retainer 104 form pockets and channels in which the fish bait 504 can be received, and which can function to help retain the fish bait 404 on the fish bait retainer 104. Moreover, as the fish bait retainer 104 will generally be fitted over the shank 112 of a fishhook 108, the fish bait 404 is advantageously positioned adjacent the point 116 of the fishhook 108.

Figure 6:
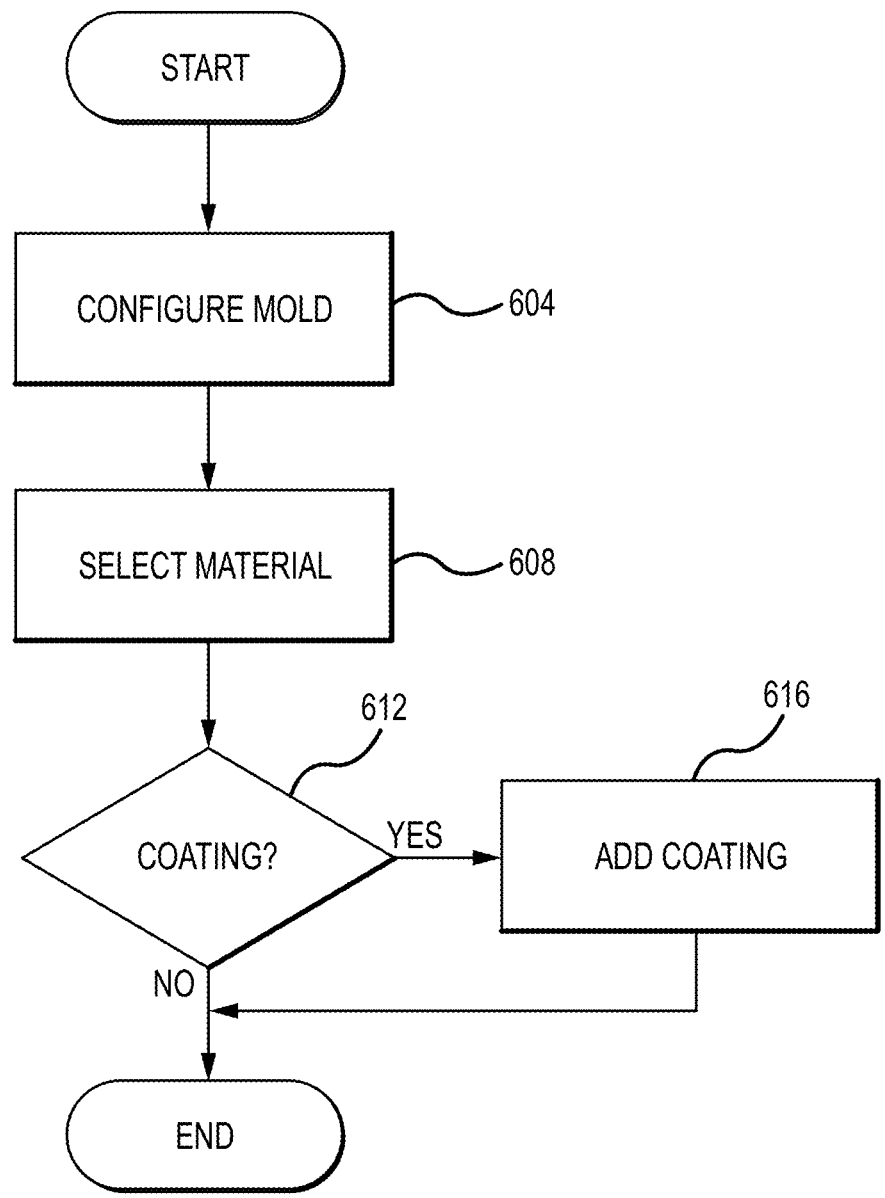
FIG. 6 depicts aspects of a method for forming a fish bait retainer in accordance with embodiments of the present disclosure.

FIG. 6 depicts aspects of a method for forming a fishing device in accordance with embodiments of the present disclosure. Initially, a mold is configured with the desired size and shaping of the finished fish bait retainer 104 (step 604). In general, the length (i.e. along the central axis 212) and width (i.e. along the midline 236) of the fish bait retainer 104 is selected based on a size of the fishhook or hooks 108 with which the fish bait retainer 104 is intended to be used. For example, a fish bait retainer 104 as disclosed herein typically has a length that is less than a length of the shaft 112 of a fishhook 108 and a width that allows some amount of open space between the fish bait retainer 104 and the point 116 of the fishhook 108 when the fish bait retainer 104 is installed on the hook 108. The number, size, spacing, and configuration of the fish bait retaining features 124 can be selected based on the size of the fish bait retainer 104, and based on the characteristics of the fish bait or baits with which the fish bait retainer 104 is intended to be used.

A material for the fish bait retainer 104 is then selected (step 608). As an example, but without limitation, the material of a fish bait retainer 104 in accordance with embodiments of the present disclosure can include an elastomer. In general, a material that is sufficiently compliant to allow the fish bait retainer 104 to be pushed over the eye 120 of a fishhook 108, and on to the shank 112 of the fishhook 108, is selected. The material should also be capable of retaining its shape. In addition, the material of the fish bait retainer 104 can be selected based on the ability to mold the fish bait retainer 104, including the fish bait retaining features 124 with sufficient fidelity and longevity. As still another consideration, the material can be selected based on the ability to be formed with a desired surface texture or roughness 304, with desired fish bait retaining properties, to provide a selected amount of buoyancy, or the like.

A determination can then be made as to whether a coating 308 is to be applied to some or all of the surface 228 of the fish bait retainer 104 (step 612). If a coating is to be applied, it is selected and added to selected portions of the fish bait retainer 104 (step 616). A coating can be selected so as to provide a desired surface property, to improve the longevity of the fish bait retainer 104, or the like. After determining that a coating is not desired, or after a coating has been added, the process of forming a fish bait retainer 104 can end.

Figure 7:
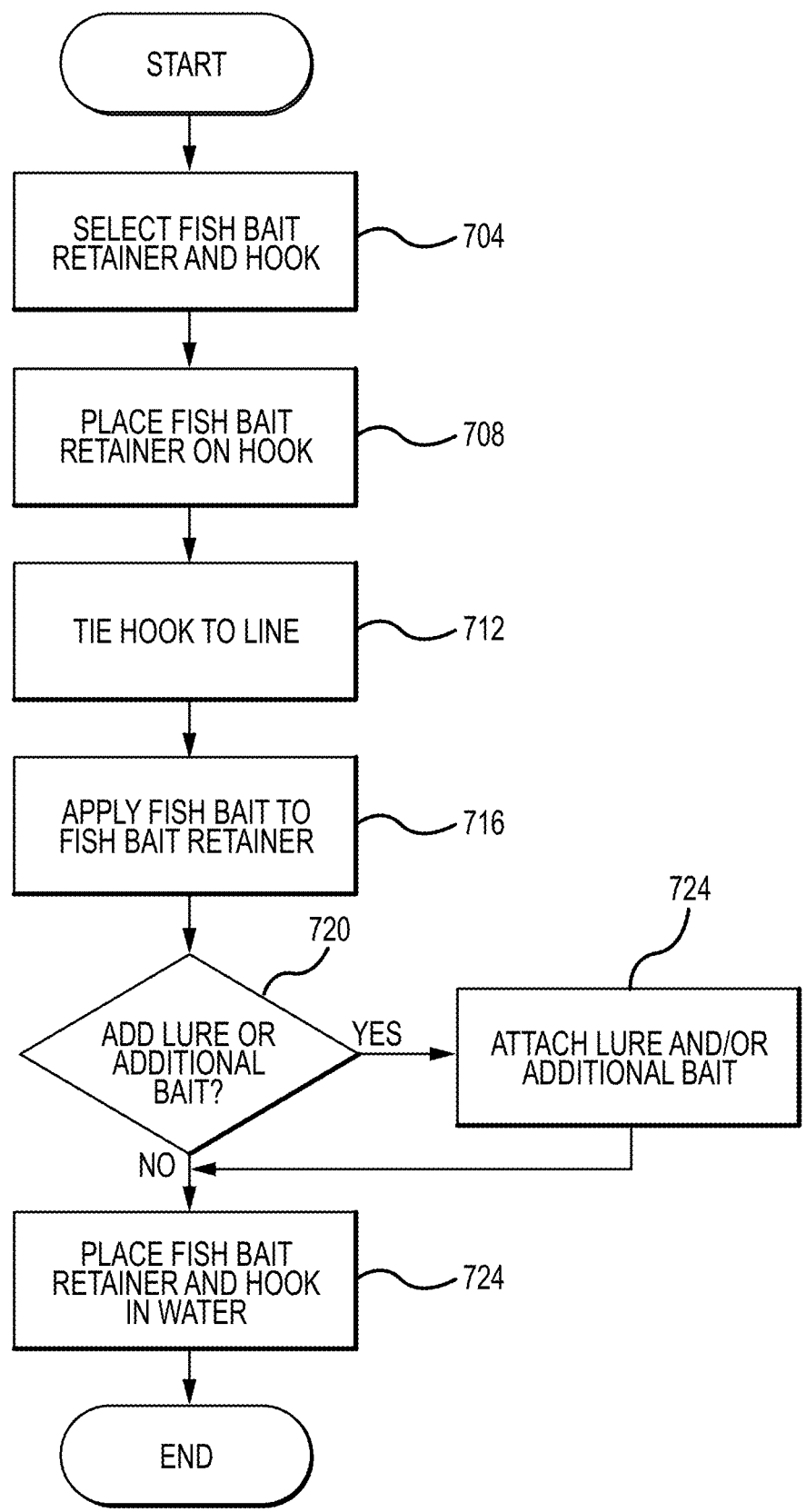
FIG. 7 depicts aspects of a method for loading and using a fish bait retainer in accordance with embodiments of the present disclosure.

FIG. 7 depicts aspects of a method for loading and using a fish bait retainer 104 in accordance with embodiments of the present disclosure. Initially, a fish bait retainer 104 configured as described herein and a fishhook 108 are selected (step 704). In general, the fishhook 108 is selected based on the fish that the angler desires to catch. As can be appreciated by one of skill in the art, this can include selecting a fishhook 108 of an appropriate size and type. Selecting a fishhook 108 can also include choosing one that is provided as part of an artificial lure. The fish bait retainer 104 can be chosen based on the fish that the angler desires to catch, as well as based on the characteristics of the selected fishhook 108. Such characteristics can include the size and color of the fish bait retainer 104.

The fish bait retainer 104 is then joined to the fishhook 108 (step 708). In accordance with at least some embodiments of the present disclosure, the fish bait retainer 104 is joined to the fishhook 108 by pushing the eye 120 of the fishhook 108 through a central hole 128 of the fish bait retainer 104, until the fish bait retainer 104 is seated over the shank 112 of the fishhook 108. In accordance with other embodiments of the present disclosure, the fish bait retainer 104 is joined to the fishhook 108 by pushing the eye 120 of the fishhook 108 through a through hole 216 other than a central hole 128 of the fish bait retainer 104, until the fish bait retainer 104 is seated over the shank 112 of the fishhook 108. In accordance with still other embodiments of the present disclosure, the fish bait retainer 104 is joined to the fishhook 108 by forming a hole through the body of the fish bait retainer 104 using the point 116 or the eye 120 of the fishhook 108 and then positioning the fish bait retainer 104 until it is seated on the shank 112 of the fishhook 108. Although various embodiments have discussed placing the fish bait retainer 104 on the shank 112 of a fishhook 108, in other configurations the fish bait retainer 104 can be seated entirely or partially on the bend of the fishhook 108, between the point 116 and the shank 112. In addition, multiple fish bait retainers 108 can be placed on a single fishhook 108.

The hook 108, with the attached fish bait retainer 104, can then be tied to a fishing line (step 712). A selected fish bait 404 or 504 is then applied to the fish bait retainer 104 (step 716). Where the fish bait is a liquid or gel type fish bait 404, the fish bait 404 can be dispensed from a container 408 directly onto the exterior surface 228 of the fish bait retainer 104, and within some or all of the fish bait retention features 124 of the fish bait retainer 104. Where the fish bait is a dough or paste type fish bait 504, the fish bait 504 can be removed from a container, placed over the fish bait retainer 104, and into the fish bait retention features 124. In accordance with at least some embodiments of the present disclosure, different fish baits can be used in combination on a single fish bait retainer 104. In addition, if the angler chooses, the fish bait can be applied to the fish bait retainer 104 prior to tying the hook 108 to the fishing line.

A determination can then be made as to whether a lure or additional bait is to be applied to the fishing tackle assembly 100 (step 720). Any lure or additional bait can be applied at step 724. For example, an artificial lure can be placed over the point 116 of the fishhook 108 and held at the bend of the fishhook 108, or can be tied to an exposed portion or portions of the shank 112 of the fishhook 108. As another example, a piece of natural bait can be placed over the point 116 of the fish of 108 and held at the bend of the fishhook 108.

The fishing tackle assembly 100, including the fish bait retainer 104, the fishhook 108, and any additional lure or bait, can then be placed in water belief likely to contain a target fish (step 724). As can be appreciated by one of skill in the art after consideration of the present disclosure, in a typical fishing scenario, the eye 120 of the fishhook 108 will be tied to an end of a fishing line that is held by an angler using a rod and reel or that is held directly in the hands of the angler. The fishing tackle assembly 100 is then cast, dropped, or otherwise placed in a desired location. The process can then end.

As an example, a fish bait retainer 104 in accordance with embodiments of the present disclosure can include a long or center axis 212 dimension that is between 4 mm and 50 mm, and a short or midline 236 dimension that is between 2 mm and 25 mm. the fish bait retention features 124 can have diameters of 0.5 mm to 5 mm. The fish bait retainer 104 can be formed from a thermoplastic elastomer using injection molding. The fish bait retainer 104 can be provided in various colors, such as red, orange, yellow, and green.

In a specific example, the fish bait retainer 104 is oblong in overall form, with a 12 mm maximum length and a 7 mm maximum width, and the fish bait retention features 124 have a minimum diameter of 1 mm. In another specific example, the fish bait retainer 104 is oblong in overall form, with a 9 mm maximum length and a 6 mm maximum width, and the fish bait retention features 124 have a minimum diameter of 0.8 mm.

Although particular examples of fish bait retainer 104 devices and methods have been described herein, it should be appreciated that additional embodiments incorporating variations and modifications to such specific examples are contemplated by the present disclosure. For instance, additional embodiments can include different numbers, arrangements, and configurations of fish bait retention features 124. As another example, a fish bait retainer 104 can have a spherical or pyramidal shape 228.

In accordance with still further embodiments of the present disclosure, a fish bait retainer 104 can be tied to or placed over a fishing line, as an alternative or in addition to placing a fish bait retainer 104 over a portion of the fishhook 108. A fish bait retainer 104 can be held in a desired location on the line by crimping a leader sleeve at a desired location on the line and then sliding the fish bait retainer 104 in place over the sleeve, such that the sleeve is received in the central through hole 128 of the fish bait retainer. As other examples, the line can be threaded through the central hole 128 of the fish bait retainer 104, and then held in place along the line using a leader sleeve or a split shot weight that has been crimped to the line in a location above the fish bait retainer 104, or by a pair of leader sleeves or split shot weights that have been crimped to the line in locations on either side of the fish bait retainer 104. As still other examples, the fish bait retainer 104 can be held in a desired location along the line by knotting the line, or by placing a tooth pick or other element between the line and the central through hole 128 of the fish bait retainer 104.

The foregoing description has been presented for purposes of illustration and description. Further, the description is not intended to limit the disclosed systems, devices, and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:
1. A fishing device, comprising:
 a body member, the body member including:

a central through channel;
a plurality of grooves in an exterior surface of the body member;
a plurality of blind holes; and
a plurality of through holes, wherein each through hole of the plurality of through holes includes a first end that intersects the exterior surface of the body member and a second end that intersects the exterior surface of the body member,
wherein at least one of the plurality of grooves, the plurality of blind holes, or the plurality of through holes are parallel to the central through channel, and
wherein the through holes and the blind holes are radially interleaved with one another.

2. The fishing device of claim 1, wherein the plurality of through holes are all parallel to the central through channel.

3. The fishing device of claim 2, wherein the plurality of grooves in the exterior surface of the body member are all parallel to the central through channel.

4. The fishing device of claim 3, wherein the plurality of blind holes are parallel to the central through channel.

5. The fishing device of claim 2, wherein each blind hole of the plurality of the blind holes extends along a respective line that is parallel to the central through channel, wherein the grooves are equally spaced radially about the central through hole.

6. The fishing device of claim 1, wherein the plurality of grooves are parallel to the central through channel.

7. The fishing device of claim 6, wherein the plurality of blind holes are parallel to the central through channel.

8. The fishing device of claim 6, wherein an area of the second end of each through hole of the plurality of through holes is larger than an area of the first end of each through hole in of the plurality of through holes.

9. The fishing device of claim 1, wherein the plurality of grooves includes full length grooves that extend along a respective line that is parallel to the central through channel, wherein, for each full length groove, a first end of the full length groove is centered on the respective line and a second end of the full length groove is centered on the respective line, and wherein the plurality of grooves also includes grooves that are terminated on one end by a wall.

10. The fishing device of claim 1, wherein the plurality of blind holes are parallel to the central through channel.

11. The fishing device of claim 1, wherein an exterior shape of the body member is spherical.

12. The fishing device of claim 1, wherein an exterior shape of the body member is that of a prolate sphere.

13. The fishing device of claim 1, wherein the body member includes a thermoplastic elastomer material.

14. The fishing device of claim 1, wherein an area of the second end of each through hole of the plurality of through holes is larger than an area of the first end of each through hole of the plurality of through holes.

15. The fishing device of claim 1, wherein each groove of the plurality of grooves extends along a respective line that is parallel to the central through channel, and wherein the grooves are equally spaced radially about the central through hole.

16. The fishing device of claim 1, wherein the body member has a long axis dimension of between 4 mm and 50 mm and a midline dimension of between 2 mm and 25 mm.

17. The fishing device of claim 1, wherein a color of the body member is one of red, orange, yellow, or green.

18. A system, comprising:
a fishhook;
a fish bait retainer,
wherein the fish bait retainer includes a body member that has one of a spherical or an elongate spherical exterior shape,
wherein the fish bait retainer includes a plurality of fish bait retaining features,
wherein the fish bait retaining features include:
    a plurality of grooves in an exterior surface of the body member;
    a plurality of blind holes; and
    a plurality of through holes, wherein each through hole of the plurality of through holes includes a first end that intersects the exterior surface of the body member and a second end that intersects the exterior surface of the body member,
wherein the fish bait retainer includes a central through channel,
wherein the at least one of the fish bait retaining features is parallel to the central through channel,
wherein the through holes and the blind holes are radially interleaved with one another, and
wherein a shank of the fishhook is received by the central through channel; and
fish bait, wherein the fish bait is disposed within at least some of the plurality of fish bait retaining features.

19. The system of claim 18, further comprising:
an artificial lure, wherein the artificial lure is joined to the fishhook.

20. A method for retaining fish bait, comprising:
providing a fish bait retainer, wherein the fish bait retainer includes a central through hole and a plurality of fish bait retaining features, wherein the plurality of fish bait retaining features include:
    a plurality of grooves in an exterior surface of a body member of the fish bait retainer;
    a plurality of blind holes; and
    a plurality of through holes, wherein each through hole of the plurality of through holes includes a first end that intersects the exterior surface of the body member and a second end that intersects the exterior surface of the body member,
    wherein the at least one of the fish bait retaining features is parallel to the central through hole, and
    wherein the through holes and the blind holes are radially interleaved with one another;
placing a shank of a fishhook through the central through hole formed in the fish bait retainer; and
placing fish bait within at least some of the fish bait retaining features.

* * * * *